United States Patent [19]

Landsman

[11] Patent Number: 4,813,321
[45] Date of Patent: Mar. 21, 1989

[54] FILM TRANSPORT MECHANISM

[75] Inventor: Robert M. Landsman, Huntington Station, N.Y.

[73] Assignee: Powers Chemco, Inc., Glen Cove, N.Y.

[21] Appl. No.: 58,817

[22] Filed: Jun. 5, 1987

[51] Int. Cl.⁴ .................................... B65H 35/04
[52] U.S. Cl. ................................ 83/111; 83/113;
83/152; 83/276; 83/650; 226/110; 242/58
[58] Field of Search ........... 83/42, 277, 276, 111–113,
83/152, 147, 167, 649, 650; 242/78.8, 58;
226/108, 110, 95; 414/83, 82

[56] References Cited

U.S. PATENT DOCUMENTS

| | | | |
|---|---|---|---|
| 3,373,644 | 3/1968 | Bjelland | 83/650 |
| 3,418,047 | 12/1968 | Lee et al. | |
| 3,550,829 | 11/1968 | Miyauchi | 226/110 |
| 3,698,572 | 10/1972 | Dahlem et al. | 414/82 |
| 3,727,499 | 4/1973 | Boston | 83/205 |
| 3,807,553 | 4/1974 | Billett et al. | 414/43 X |
| 3,850,356 | 11/1974 | Abe et al. | 226/110 |
| 3,941,048 | 3/1976 | Oe et al. | 414/82 X |
| 4,003,527 | 1/1977 | Schulze | 242/58 |
| 4,085,879 | 4/1978 | Nobuhiro | 225/93 |
| 4,442,744 | 4/1984 | Raymond | 83/614 |
| 4,544,824 | 10/1985 | Knutsson | 83/152 X |
| 4,576,469 | 3/1986 | Shiga et al. | 355/29 |

FOREIGN PATENT DOCUMENTS 0048350 3/1984 Japan ................................ 83/650

*Primary Examiner*—Frank T. Yost
*Assistant Examiner*—Eugenia A. Jones
*Attorney, Agent, or Firm*—Morgan & Finnegan

[57] ABSTRACT

A film transport mechanism for extracting film from one or more cassettes, and for slicing a sheet of the film and storing the sheet at a temporary storage apparatus until the sheet is to be loaded. The mechanism includes a film guide which moves between two positions to alter the path length of film passing over it. As film is extracted the film exerted a force on the film guide causing the film guide to move. When the film is cut the force of the film guide disappears enabling the film guide to return to its relaxed position into the path of the film so as to increase the path length and thereby retract the film passing over the film guide.

4 Claims, 3 Drawing Sheets

FILM TRANSPORT MECHANISM

FIELD OF INVENTION

This invention relates to a mechanism for transporting film from a cassette and, more particularly, to a mechanism for transporting film from one of a number of cassettes to an optical scanning system.

BACKGROUND

In optical scanning systems and the like for recording images on film sheets, the film is often supplied from cassettes. Typically, for such applications as facsimile recording for use in making newspaper printing plates, the film is supplied as a continuous wide sheet, and the cassettes, when fully loaded, have substantial weight. Film is withdrawn as needed, cut to the desired length and placed upon a platen where it is exposed by a traveling scanning beam modulated with the image(s) to be recorded on the film.

Automatic film transport mechanisms were not included in early scanning systems. The early scanning systems were facsimile systems that utilized scanners for reading an image and drum recorders for recording the image. Typically, at the transmitting site, an operator was required to load each original page individually on the scanner while, at the receiving site, an operator loaded each film sheet on the drum recorder individually. At the conclusion of scanning of each original page, the recorded pages were removed from the equipment manually. A disadvantage of such systems was the delay between transmissions occasioned by the manual loading and unloading of originals and film.

In the 1970's flatbed recorders were introduced having an on-line film processor and an automated feed mechanism. The automated feed mechanisms on the receiving equipment reduced the labor requirements over prior systems. Typically, film was extracted from a cassette and loaded into the optical scanning system in time sequence. The film sheet for the next page was not extracted or transported until imaging of the prior film sheet was completed.

In applications such as the newspaper industry it is important to minimize the time allocated between transmissions for loading and unloading film.

Some systems have included only a single cassette of film. If the cassette does not hold enough film for an entire series of transmissions, an additional delay occurs while the cassette is changed. More recently, the approach has been to use two cassettes supported on movable holders which can be activated to bring the needed cassette into position where film can be extracted. The disadvantage of this approach is that it requires rather powerful mechanisms for transporting the heavy cassettes from one position to the next.

SUMMARY OF THE INVENTION

It is an object of the invention to provide a film transport system that reduces the time and operations of film transport that occur between imaging sheets of film.

It is another object of this invention to provide a film transport mechanism having a temporary storage area to which an extracted and cut sheet of film can be positioned for rapid loading into the scanning system once the prior sheet of film has been imaged.

It is another object of the invention to provide a film transport system having the programmed capability to extract film from either of one or more cassettes.

These and other objects of the invention are provided by a film transport mechanism having two or more cassettes in which film may be withdrawn from either cassette without cumbesome movement of the cassettes when switching from one to the other. Fundamentally the invention includes means for exposing the leading edges of the film sheets from two or more cassettes. In the embodiment described, the leading exposed portions of the film sheets are generally parallel and, preferably in face to face contact. Leading edges of the respective film sheets are staggered so that a leading edge of either of the films may be captured and pulled away from the cassette by suitable means such as a vacuum bar. Film withdrawn from the cassettes is transported onto a temporary storage location. After a preprogrammed length of film has been removed, the vacuum bar stops and the film is cut and allowed to remain in the temporary storage location pending use, such as loading onto an optical scanning system.

As described in some detail in the full description of the preferred embodiment a resiliently biased film guide is used to retract the cut film of one cassette away from the cutting location to expose the leading edge of film from the other cassette. In this manner the both leading edges are always (or at least controllably) exposed.

Specifically, the film guide preferably is moveable between two positions, depending on the tension exerted on the film being pulled from the cassette and passing over the guide. Thus, as the film is being withdrawn from the cassette, the force exerted on the film guide causes the film guide to overcome a resilient biasing force and deflect into a tensioned position. When the film is cut, the film tension, and consequently the guide deflecting force disappears. The film guide thereupon returns its normal position which lengthens the film travel path and causes the free leading edge to retract. As a result, the leading edge of the film from the other cassette is exposed for capture in a subsequent loading operation.

In the preferred embodiment, the vacuum bar used to capture the film is programmed to advance to the leading edge position of either film. Suction applied to the vacuum bar holds the film to the vacuum bar, which then moves in a direction to cause the film strip to be pulled from the cassette. When the film strip is fully extracted a knife automatically cuts the film to a preprogrammed dimension. The cut sheet of film thereupon rests on a temporary storage bed which is retractable in such a way that the film sheet falls into position upon the top surface of the platen.

Extraction and cutting of the film occurs while a prior sheet of film is being imaged by the optical scanning system. When imaging is complete, the prior sheet is unloaded, the temporary storage bed is retracted and the new sheet is loaded into the optical scanning system. The sequence then repeats.

DETAILED DESCRIPTION OF A PREFERRED EMBODIMENT OF THE INVENTION

Figure 1:
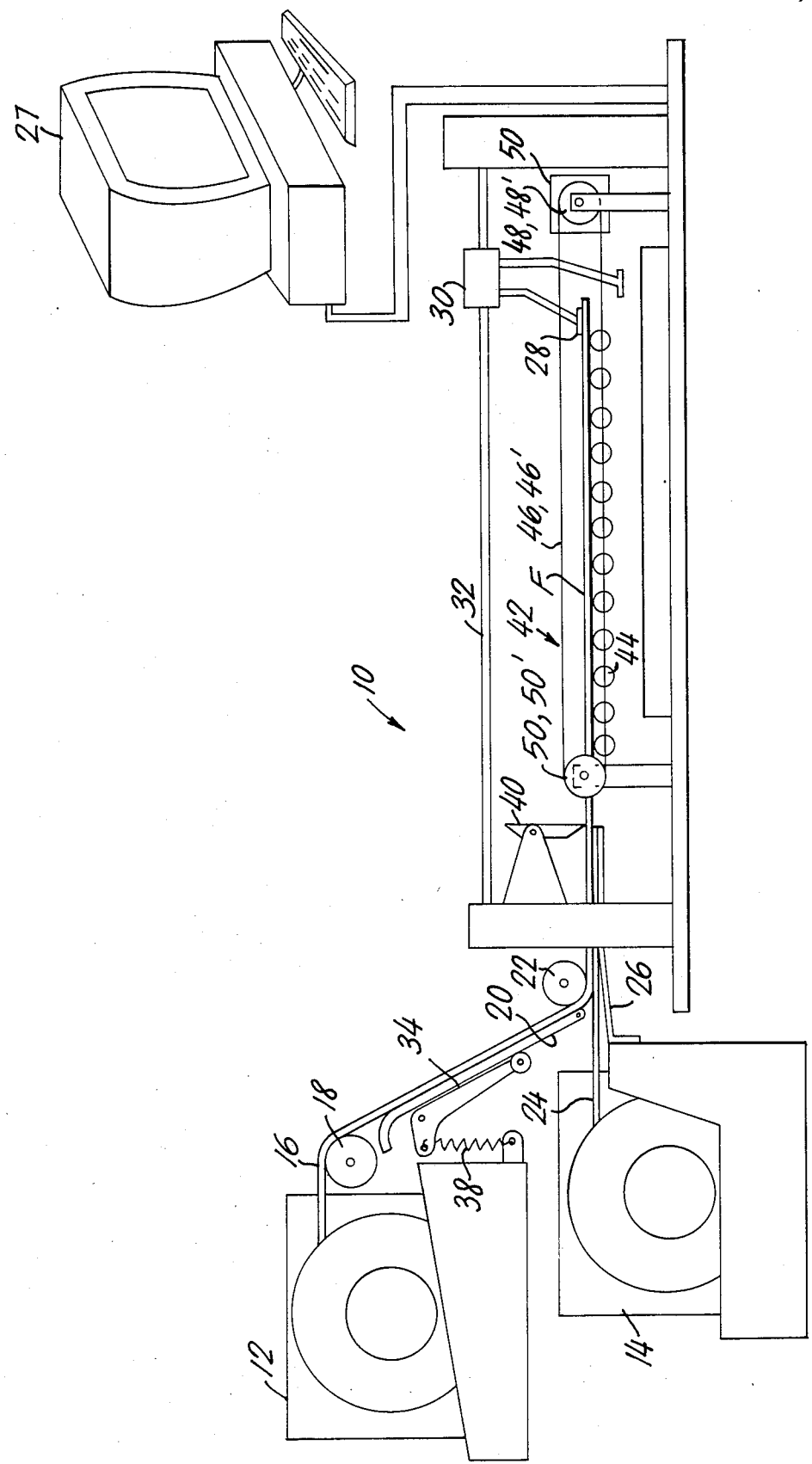
FIG. 1 is a side elevation view of one embodiment of the film transport mechanism of the invention.

Referring to FIG. 1, a film transport mechanism embodying the several features of the invention is indicated generally by the numeral 10. Two film cassettes 12, 14 are depicted although additional cassettes may be used.

The cassettes 12, 14 typically include a spool, or roll, of sheet film up to 26 inches wide and 300-400 feet long carried on a central axle or mandrel. The cassettes are positioned one above the other. Film 16 from the top cassette 12 follows a path over a freely rotatable guide roller 18 and film guide 20 and under a second rotable guide roller 22. Film 24 from the lower cassette 14 follows a path between the roller 22 and a support platform 26 in face-to-face sliding contact with the top film sheet 16.

A system computer 27 controls the operations of the film transport mechanism. In one embodiment, the system computer 27 is an IBM personal computer, although other computers may be used. The computer system is not critical, and can be readily programmed with standard programming techniques to direct the operations performed by the various system elements.

Figure 2:
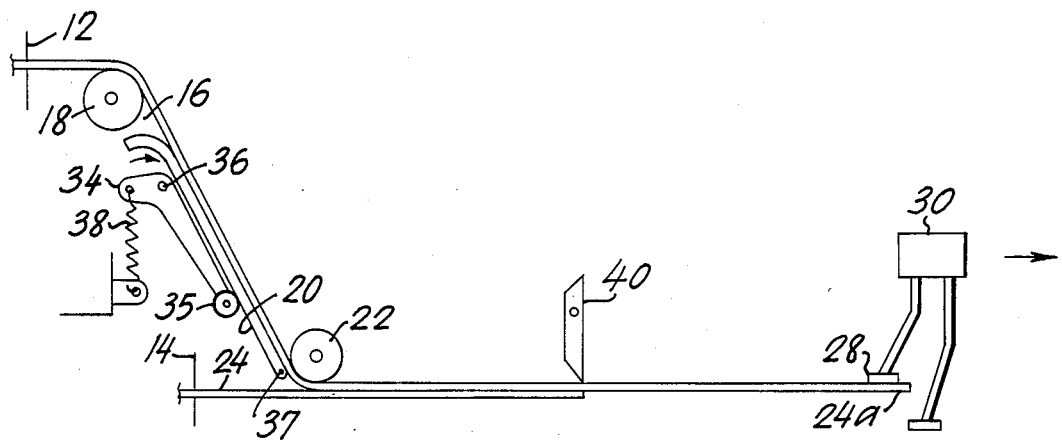
FIG. 2 is a partial side elevation view of the film transport mechanism showing the extraction of film from the upper cassette with the film guide in a deflected position.
Figure 3:
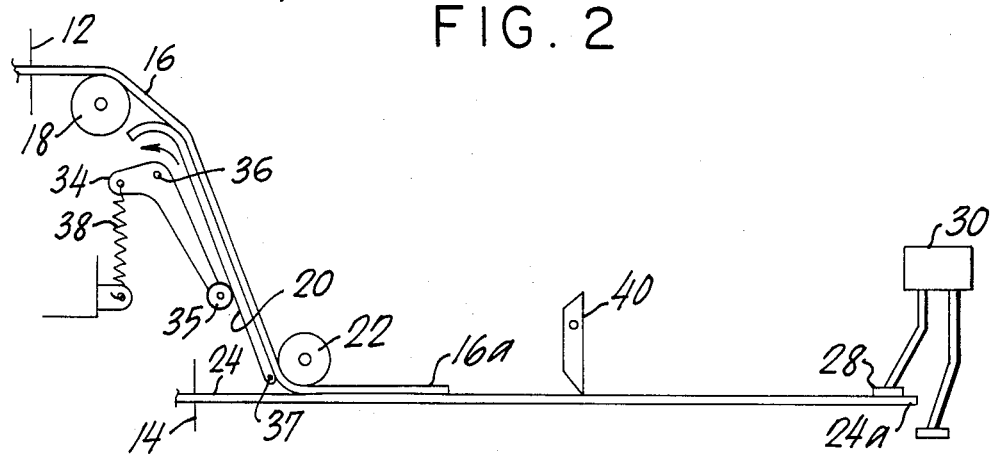
FIG. 3 is a partial side elevation of the film transport mechanism showing the extraction of film from the lower cassette with the film guide in the relaxed position.

FIGS. 1 and 2 illustrate the extraction of film from the top cassette. Upon command from the system computer 27 the the motor assembly 30 advances the laterally extending vacuum bar 28 along longitudinal rails 32 to the leading edge of the top film 16 of the top cassette 12. The computer 27 then issues a command to lower the vacuum bar 28 and to apply a vacuum to the surface in contact with the film and thereby capture and hold the film sheet 16. The computer 27 next commands the motor assembly 30 to travel along the rail 32 away from the cassette 12, thereby, pulling the film 16 from the cassette 12. FIG. 3 shows the vacuum bar after it has captured the leading edge of the film 16 and advanced sufficiently to have partially extracted a predetermined length of film sheet from the cassette.

As the film 16 is pulled, the guide rollers 18 and 22 guide it against the film guide 20. The tension on the film strip forces the strip against the top surface of the film guide 20 and establishes a moment at pivot pin 37 at the base of the film guide 20. The film guide pushes against cam 34 at a wheel 35 causing the cam to rotate about a point of rotation 36. The rotation of the cam 34 expands spring 38 and moves the wheel 35 down the film guide 20. It is to be noted that cam 34 is normally biased into a normal position, shown in FIG. 3, by a spring 38. In the normal position, the film path between the two guide rollers 18, 22, is extended. However, as shown in FIG. 2, when film 16 is under tension during extraction, the bias force of the spring is overcome and the film guide deflects to the position shown to shorten the path of the film 16 between rollers 18 and 22.

The motor assembly 30 moves along the rails 32 to extract a preprogrammed length of film. As the film strip is extracted, it is positioned on or above the surface of temporary storage device 42 (FIG. 1). Once a preprogrammed length of film is extracted, the computer 27 issues a command to a conventional roller cutter 40 to move laterally across the film 16 and slice a film sheet. The sheet thereupon rests on the temporary storage device 42.

Once the film 16 has been cut, the tension on the film strip is reduced. As a result, the spring 38 contracts and resiliently biases the cam 34 such that the film guide 20 rotates clockwise about the pivot 37 into the normal position shown in FIG. 3. The path of the film 16 between the rollers 18, 22 thereby increases and the leading edge 16a of the upper film is pulled back to expose the leading edge 24a of the lower film.

Figure 5:
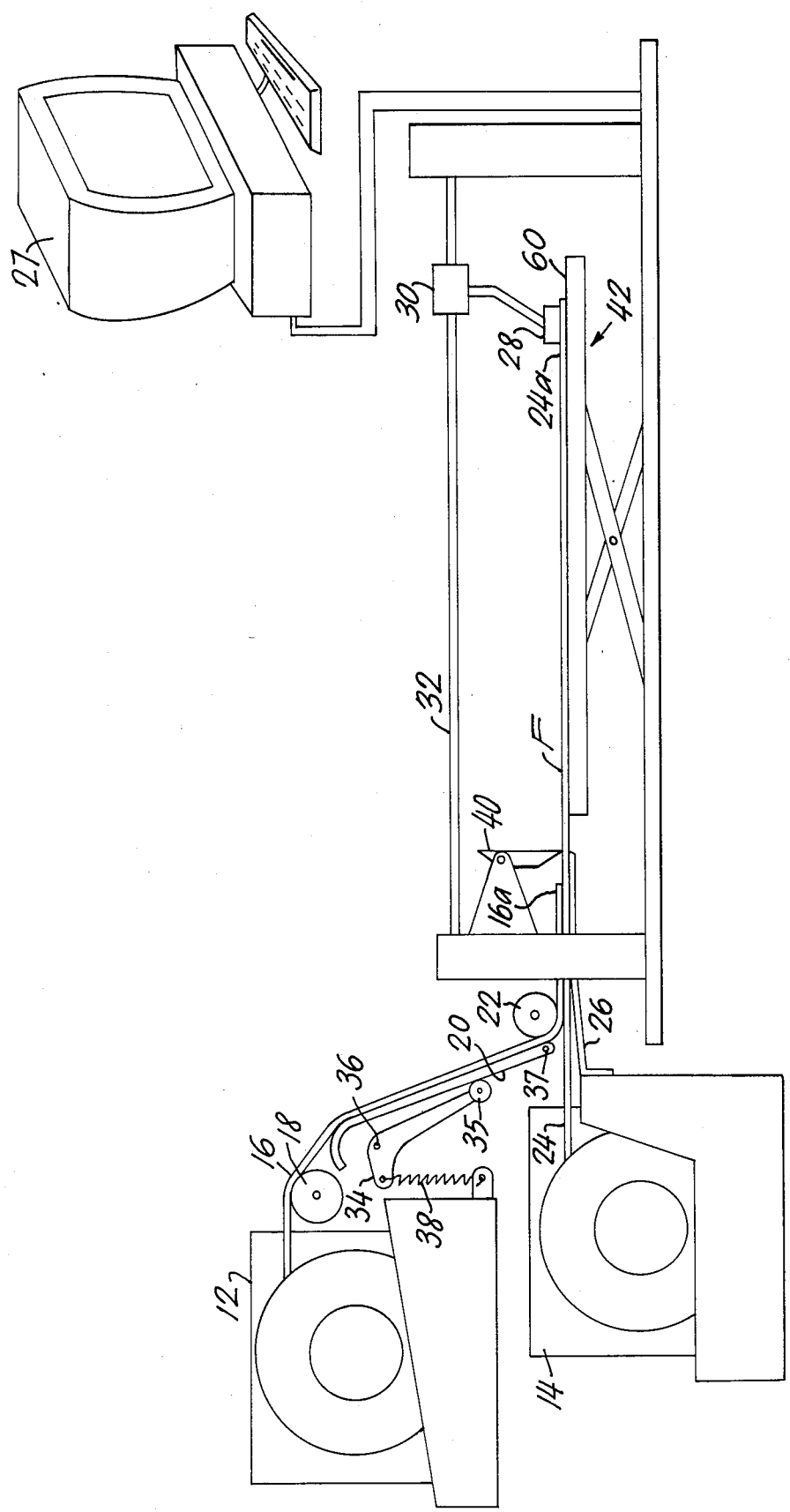
FIG. 5 is a side elevation of a platen embodiment of the temporary storage device.

Referring to FIGS. 3 and FIG. 5 (which depicts an alternate form of storage mechanism), the extraction of film from the lower cassette 14 is illustrated. In response to a commands from the system computer 27, the motor assembly 30 advances the vacuum bar 28 to the leading edge 24a of film of the lower cassette 14, the vacuum bar is lowered and suction is applied to capture and hold the lower film. Next, motor assembly 30 travels along the rails 32 away from the lower cassette 14 to pull the lower film strip over the temporary storage device 42. In FIG. 3, the vacuum bar 28 is shown advancing with the leading edge of the film 24 in a direction toward the end of travel. In FIG. 5, the vacuum bar and film strip are in the fully advanced position.

As previously explained, the motor assembly 30 advances a controlled distance until a preprogrammed length of film is extracted and the film is positioned above the surface of the temporary storage device 42. The roller cutter 40 is then activated to move laterally across the film 16 and slice a sheet F. The sheet rests on the temporary storage device 42.

Figure 4:
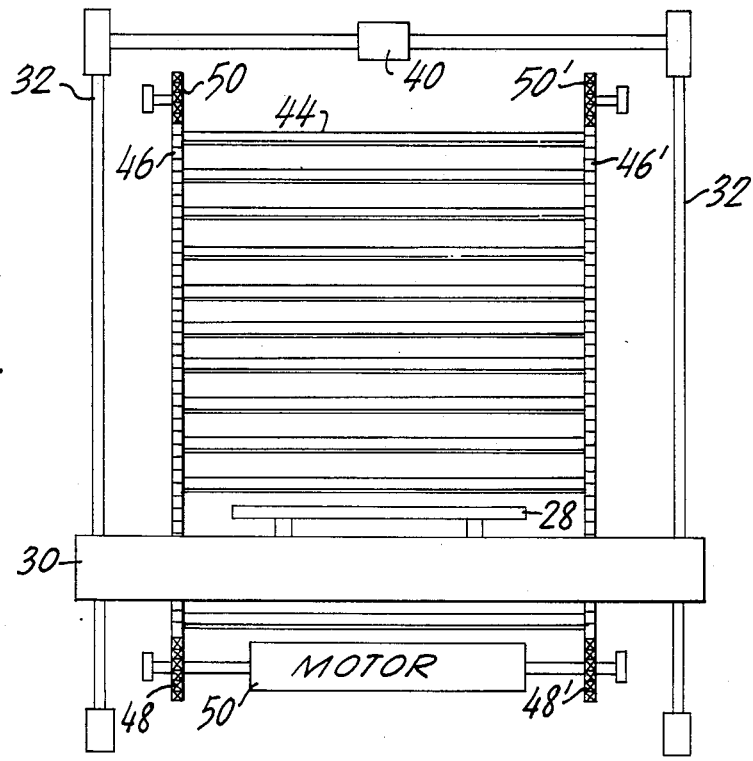
FIG. 4 is a top elevation of a curtain assembly embodiment of the temporary storage device.

In the embodiment of FIGS. 1 and 4, the temporary storage device 42 is a curtain assembly. The curtain assembly includes a bed of laterally extending rods 44 which move in a loop defined by parallel chain assemblies. Each chain assembly includes a chain 46, 46' and end sprockets 48, 48' and 50, 50'. Rods 44 are mounted at their respective ends to the chain assemblies.

Each chain assembly forms a closed generally parallel loop which has two generally flat levels. The bed of rods 44 spans approximately one half or less of the chain length so that the rods form a substantially flat bed at a lower level or an upper level. The chains 46, 46' may rotate to move the bed of rods 44 between the lower level and the upper level.

In operation the computer issues a command to position the bed of rods 44 at the lower level while film is extracted and moved onto the rods. In an alternative embodiment the curtain assembly could be positioned to have the film move onto the rods at the upper level. Typically a sheet of film is being extracted and cut while another sheet is being imaged by the scanning system. While the vacuum bar 28 still holds the film, the chains rotate the rods 44 out from under the film and into the upper position. After the bed of rods 44 moves from under the film, the computer 27 issues a command for the vacuum bar to release the film onto the platen of the scanning system.

While the sheet is being scanned in the optical scanner, the chains rotate the rods back into the lower position and the next sheet of film is extracted and cut. The computer 27 can be programmed to track the number of sheets extracted from one cassette and to alter the movement of the motor assembly 30 along rails 32 to position the vacuum bar 28 at the leading edge of film from either cassette.

In a second embodiment the temporary storage device 42 is a storage platen 60 as seen in FIG. 5. In operation the storage platen 60 is positioned in the lower position while film is extracted and cut. While the film is extracted and cut a prior sheet of film normally is imaged by an optical scanner. Once the prior sheet is scanned and unloaded, the storage platen raises to an upper position upon command from system computer 27. In one configuration the film is pressed against a vacuum platen of an optical scanner which then holds the film with a suction force and moves the film into a position to be scanned.

While preferred embodiments of the invention have been illustrated and described, the invention is not intended to be limited to the exact embodiment illustrated. The scope of the invention is intended to be determined by reference to the claims and their equivalents interpreted in light of the prior art.

I claim:

1. A film transport mechanism for selectively extracting film from a plurality of film cassettes comprising:
   a film guide defining a film extraction path and moveable about a moment at the base of the film guide between a first position and a second position under tension from the film to increase or decrease the film path length for selectively positioning a leading edge of film for capture;
   a cam supporting the film guide at a point of support, the cam rotating and the point of support moving along the film guide as the film guide moves between the first and second position; and
   an extraction bar for selectively capturing the leading edge of film from one of a plurality of film cassettes so as to extract the film.

2. A film transport mechanism for extracting film from one of two or more cassettes comprising:
   a means for extracting film from one of two or more cassettes;
   a means for cutting a sheet of film;
   a means for storing a cut sheet of film;
   a film guide defining the path of the film from a cassette, wherein the film guide moves about a moment at the base of the film guide between a first position at which the film does not exert a force on the film guide and a second position at which the film does exert a force on the film guide, and wherein the path of the film is decreased when the film guide moves from the first position to the second position;
   a cam supporting the film guide at a point of support, the cam rotating and the point of support moving along the film guide as the film guide moves between the first and second position; and
   wherein after film from the first cassette is cut by the means for cutting, the film guide moves from the second position back to the first position to increase the path of the film and retract the leading edge of film from the first cassette.

3. A film transport mechanism for selectively extracting film from a plurality of film cassettes comprising:
   a guide means for defining a film extraction path comprising a resilient film guide rotatable about a moment at the base of the film guide and a cam for biasing the resilient film guide between a first position and a second position to increase or decrease, respectively, the film path length for selectively positioning a leading edge of film for capture; and
   an extraction bar for selectively capturing the leading edge of film from one of a plurality of film cassettes.

4. A film transport mechanism for selectively extracting film from a plurality of film cassettes comprising:
   a means for extracting film from one of two or more cassettes;
   a means for cutting a sheet of film;
   a means for storing a cut sheet of film;
   a resilient film guide defining the path of the film from a cassette, wherein the resilient film guide moves about a moment at the base of the film guide from a first position at which the film does not exert a force on the film guide to a second position at which the film does exert a force on the film guide, and wherein the path of the film is decreased when the film guide moves from the first position to the second position;
   a cam supporting the film guide at a point of support, the cam rotating and the point of support moving along the film guide as the film guide moves between the first and second position; and
   wherein after film from the first cassette is cut by the means for cutting, the film guide moves from the second position back to the first position to increase the path of the film and retract the leading edge of film from the first cassette.

* * * * *